March 27, 1962    J. F. CAREY, SR    3,026,625
SURVEYING INSTRUMENT
Filed Nov. 23, 1959

INVENTOR.
John F. Carey, Sr.

United States Patent Office 3,026,625
Patented Mar. 27, 1962

3,026,625
SURVEYING INSTRUMENT
John F. Carey, Sr., P.O. Box 255, Cornelia, Ga.
Filed Nov. 23, 1959, Ser. No. 854,879
2 Claims. (Cl. 33—212)

This invention relates to surveying instruments, and more particularly to level means for simplifying the operation of setting up such instruments.

Surveying instruments such as theodolites, are adapted for removable securement to the apex of a tripod. The lower portion of the instrument is provided with level adjusting screws by which the instrument is adjusted to a level stance utilizing levels provided on the instrument.

It will be appreciated that the levels provided for such purposes are exceedingly sensitive, and further, the adjusting screws must also be sensitive and have a somewhat limited travel. Consequently, the tripod must be initially positioned so as to provide a platform which is substantially level, or considerable time is spent in adjusting the finely threaded adjusting screws to compensate for the unlevel platform. The degree to which such screws have to be adjusted will not be indicated by the sensitive levels until a level stance is very nearly realized, and as a result, such screws will be frequently turned to their maximum degree of adjustment necessitating a resetting of the tripod and a resulting further unknown adjustment.

These repeated operations become exceedingly time consuming, and present a considerable problem to the lesser skilled and even skilled personnel when setting up an instrument on unlevel ground.

It is therefore a primary object of this invention to provide a levelling means for securement to the top surface of a tripod platform which enables the initial placing of the tripod to be made so that the platform is substantially level prior to adjusting the instrument.

It is a further object of this invention to provide a levelling means of the above class which is particularly designed for use in conjunction with a tripod.

It is a still further object of this invention to provide a levelling means which is suitable for securement to existing tripod platforms and yet which may be readily incorporated in the manufacture of new equipment.

It is yet a further object of this invention to provide a levelling means of the above class which is of rugged practical construction and which may be manufactured at reasonable cost.

A full understanding of the details of the invention together with further advantages, will become apparent by reference to the following detailed description of a preferred embodiment thereof, taken in conjunction with the attached drawings wherein.

Similar reference characters indicate corresponding parts throughout the several views in the drawing.

Figure 1:
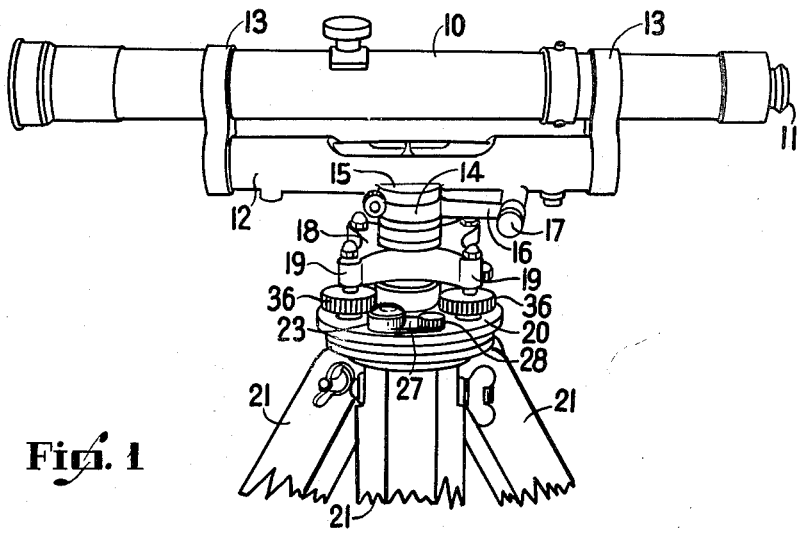
FIG. 1 is a perspective side elevation of a surveyor's telescope mounted on a tripod and having the levels of my invention incorporated on the tripod platform.

Referring now to the drawing in detail, the numeral 10 represents a telescope having an eye-piece 11 disposed at one end. An elevation level 12 is located beneath the telescope and is rigidly secured in a parallel relationship by straps 13. The telescope and level are mounted for rotation in a horizontal and vertical plane by a sleeve 14 mounted horizontally on a vertical post 15, and a projecting arm 16 pivotally mounted on a horizontal pin 17 which issues from the lower part of the level. The post 15 projects from an adjustable base 18 having four diametrically opposed projecting arms 19. The base 18 is adjustably secured to a tripod platform 20 and is provided with four knurled adjustment screws 36, threadably received within the projecting arms 19. The platform 20 has three depending legs 21 which are adjustable in length, and provide a tripod for the platform.

Figure 2:
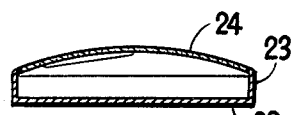
FIG. 2 is a cross sectional side elevation of a level glass showing a bubble indicating the unlevel attitude of the level.
Figure 4:
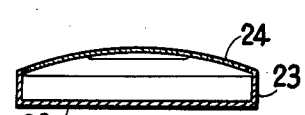
FIG. 4 is a cross sectional side elevation of a level glass showing the bubble indicating a level attitude.
Figure 6:
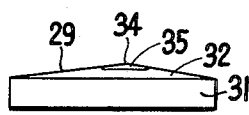
FIG. 6 is a side elevation of a modified form of level glass particularly adapted for simplifying the operation of leveling a tripod.
Figure 3:
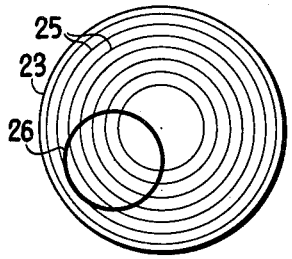
FIG. 3 is a plan view of the level shown in FIG. 2.
Figure 5:
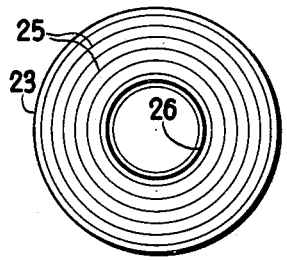
FIG. 5 is a plan view of the level shown in FIG. 4.

A circular level casing 22 is provided with a circular upstanding side wall 23 and a spherical transparent top glass 24. Circular type levels are not normally provided for instuments of this class. However, it is intended that the radius of curvature of the outwardly convex top glass should be less than that normally considered necessary for the accurate set up of the actual instrument, thus simplifying the rapid approximate levelling of the platform. Circular concentric rings 25 may be provided on the transparent top 24 to further simplify the levelling operation. The casing 22 is substantially filled with a suitable fluid which forms a convenient sized bubble 26. A level stance is indicated in FIG. 4, showing the bubble in a central concentric relation with respect to the rings 25, and an unlevel stance is indicated in FIG. 2, showing the bubble eccentrically located. The level casing may be mounted on a flat base 27 which extends outwardly to one side thereof, and terminates with a holding set screw 28, for removably securing the level to the platform.

Figure 7:
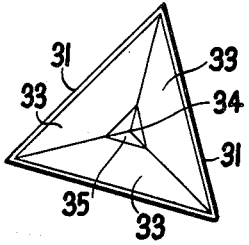
FIG. 7 is a plan view of the modified level shown in FIG. 6.
Figure 8:
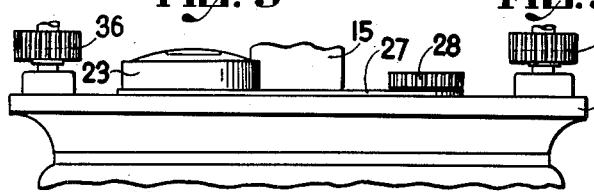
FIG. 8 is a fractional side elevation showing the tripod platform and a level of my invention incorporated.
Figure 9:
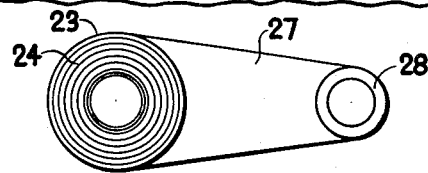
FIG. 9 is a plan view of a level glass and casing with associated adjustment set screw.

FIG. 7 shows a modified level casing 29 which may be mounted for use in conjunction with the circular level on the platform 20. The casing 29 consists of a triangular base having upstanding sides 31 of equal length. The top glass 32 is formed in the shape of a pyramid having three sloping triangular surfaces 33 which meet centrally of the level at an apex 34. The casing is similarly filled with liquid to provide a bubble 35. The casing 29 is mounted on the platform 20 such that the bisecting lines through each corner of the triangular base are each parallel to the vertical planes formed by the tripod legs. Such unique mounting enables the operator to determine which tripod leg requires adjustment in order to bring the platform into a level position.

Either of the above levels may be used efficiently for levelling the platform, or if desired, both can be mounted in different locations on the same platform.

Having described the invention in a preferred form, it will be appreciated that some modifications may be made to the precise configuration, without departing from the scope or spirit of the invention, as defined by the following claims.

I claim:
1. A level for use in conjunction with an adjustable tripod and comprising, a casing having a flat triangular base surrounded by upstanding sides, a transparent top glass of uniform thickness having three upwardly sloping triangular surfaces which meet at an apex disposed centrally of the base and spaced above the upstanding sides, and liquid substantially filling the casing to provide a bubble space beneath the top glass.

2. A level according to claim 1 wherein the upstanding sides of the casing are equal in length and wherein lines bisecting the angles formed between the sides are disposed parallel with vertical planes formed by the tripod legs.

References Cited in the file of this patent

UNITED STATES PATENTS

| | | |
|---|---|---|
| 1,898,367 | Heinze | Feb. 21, 1933 |
| 2,305,233 | Blaschke | Dec. 15, 1942 |
| 2,514,492 | Hayward | July 11, 1950 |